April 3, 1962  R. V. SCHIFFBAUER ET AL  3,028,502
INK SCANNER FOR PRINTED PAPERS
Filed Dec. 31, 1957  2 Sheets-Sheet 1
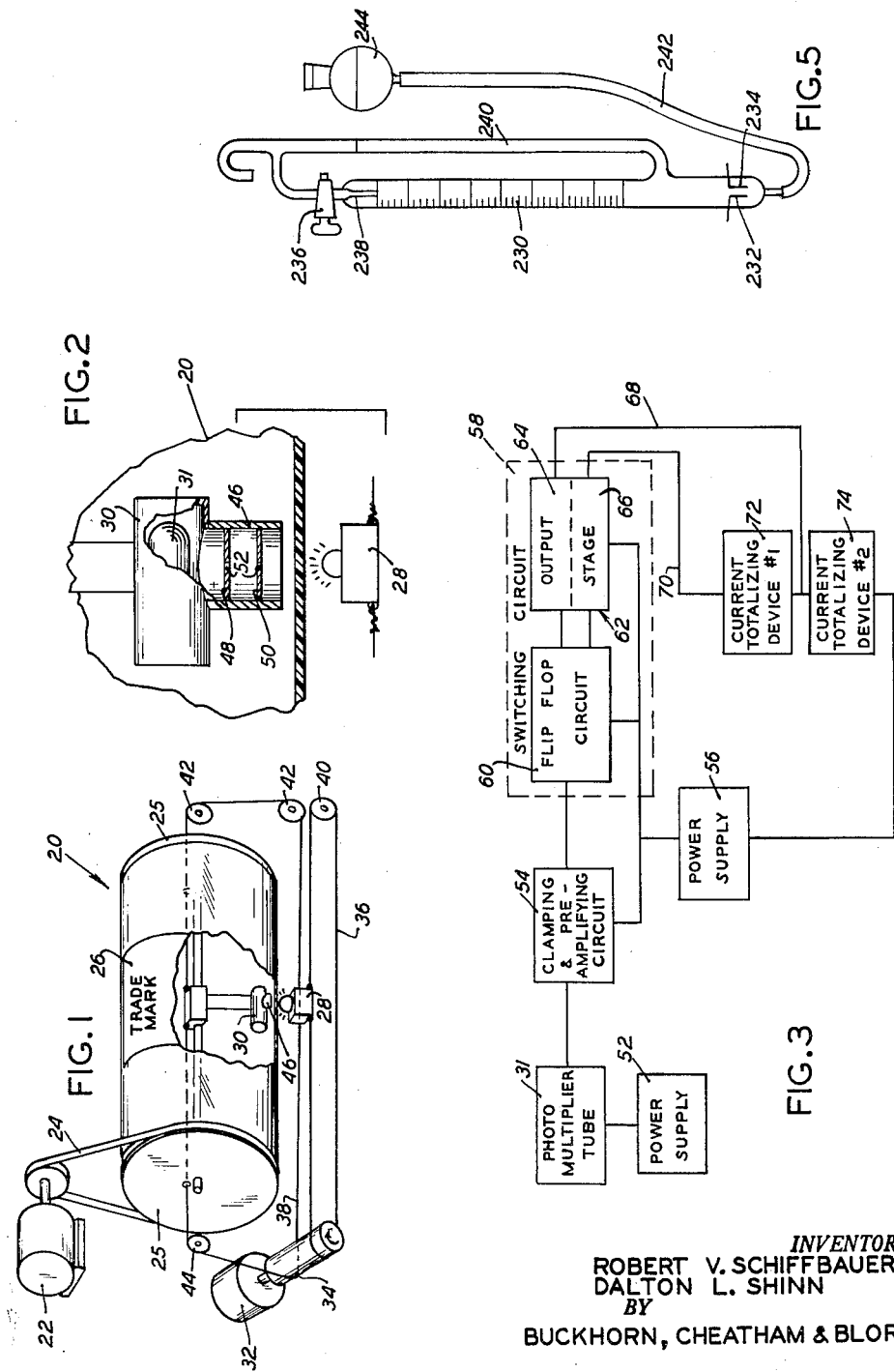
INVENTORS.
ROBERT V. SCHIFFBAUER
DALTON L. SHINN
BY
BUCKHORN, CHEATHAM & BLORE
ATTORNEYS

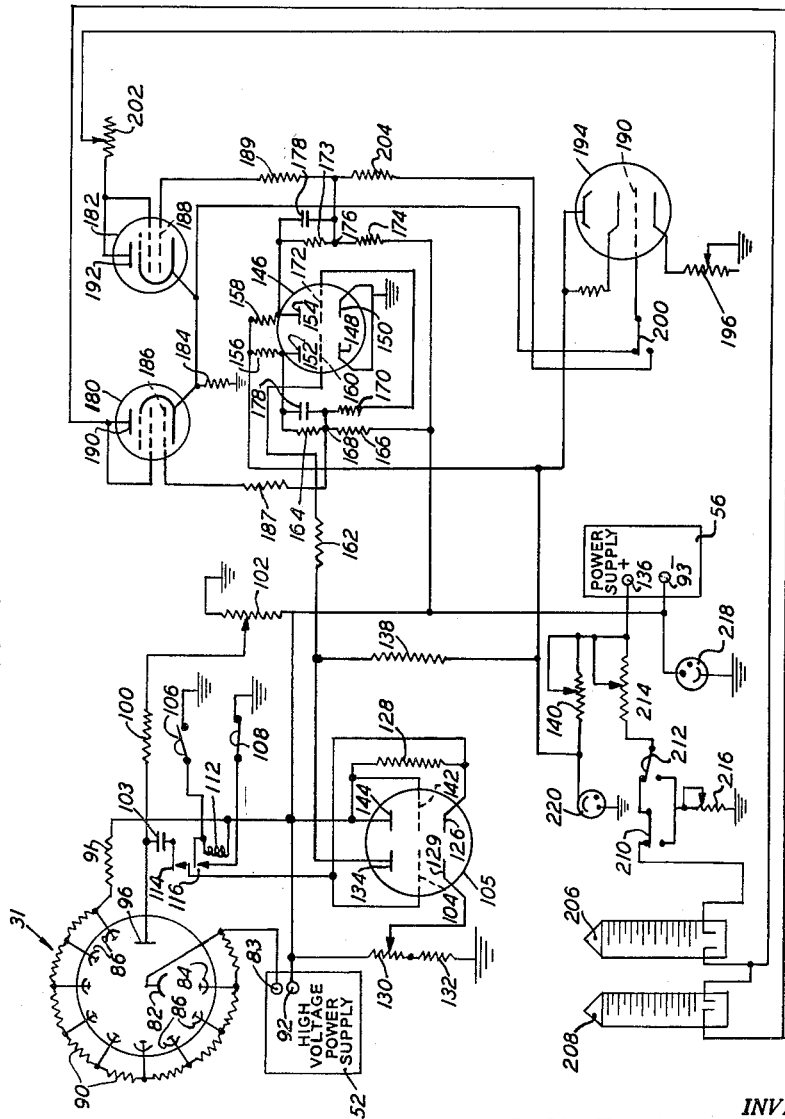

United States Patent Office 3,028,502
Patented Apr. 3, 1962

3,028,502
INK SCANNER FOR PRINTED PAPERS
Robert V. Schiffbauer, Daly City, Calif., and Dalton L. Shinn, Camas, Wash., assignors, by direct and mesne assignments, to Crown Zellerbach Corporation
Filed Dec. 31, 1957, Ser. No. 706,347
7 Claims. (Cl. 250—219)

The present invention relates to apparatus and means for measuring the ratio of two areas of an object having photo contrast with respect to each other. More particularly, the invention relates to apparatus for measuring inked and uninked areas on the surface of paper.

It is presently the practice to establish the price on much printed material on the basis of the percentage of ink coverage on the material. Heretofore, it has been the practice to measure mechanically the inked area, but obviously with irregular outlines, it is virtually impossible to secure an accurate measurement of the inked area.

It is, therefore, a principal object of the present invention to provide a new and improved means and method for determining the inked area on the surface of printed matter.

It is a further object of the present invention to provide apparatus automatically to determine the ratio of an inked area to the total area of a sample of printed matter.

Still another object of the present invention is to provide an apparatus of the class described which may be operated by unskilled personnel to produce an extremely rapid determination of such ratio and which will require a minimum of adjustment.

Other objects and advantages of the present invention will appear hereinafter.

In accordance with the present invention, photoelectric scanning means is provided for scanning an object having two areas of photo contrast, such as printed matter, to sense such areas of photo contrast. The photoelectric means is connected to an electronic circuit having two output circuits. The electronic circuit is so designed as to be responsive to signals generated by the photoelectric means when one of the areas of contrast is observed as to generate a current in one of the output circuits, and alternately to generate a current in the other output circuit when the other area of photo contrast is observed by the photoelectric means. Two current totalizing devices are provided, one of which is connected in series with both of said circuits, the other being connected in only one of said output circuits. Thus one current totalizing device gives an indication proportional to the total area scanned while the other current totalizing device gives an indication proportional only to one of the areas of photo contrast, thus enabling the ratio of total area to such contrast area to be readily determined. For a more detailed description of the invention, reference is made to the following specification and accompanying drawings wherein:

FIG. 1 is a schematic perspective view showing apparatus for supporting and scanning a sample of printed material;

FIG. 2 is an enlarged sectional view showing a detail of the scanning apparatus;

FIG. 3 is a block diagram of the circuitry of the invention;

FIG. 4 is a detailed circuit diagram of the invention; and

FIG. 5 is a schematic view of a gas coulometer such as may be utilized in the present invention.

Since, except for certain details hereinafter to be brought out, the mechanical construction of the various components of the apparatus of the invention is not critical, schematic drawings are used for the purpose of illustrating the invention.

Scanning Apparatus

It will be apparent to those skilled in the art that various types of scanning apparatus may be utilized in connection with the present invention. A suitable type of apparatus is schematically illustrated in FIG. 1 and includes a transparent, rotatable cylinder 20 which may be driven by a suitable constant speed motor 22 connected to the cylinder by suitable means such as a belt 24, the cylinder being supported for rotation with respect to stationary ends 25. The sample of printed material 26 to be measured is secured upon the surface of the cylinder 20 by any suitable means.

A photoelectric unit is provided for scanning the sample 26 to detect the printed and unprinted areas thereon and which unit includes a light source indicated at 28 and a casing 30 for a photoelectric cell or tube 31 shown in FIG. 2. In FIG. 1, the light 28 is shown located exteriorly of the cylinder 20 and the tube casing 30 within, but obviously, these positions could be reversed. Means are provided to cause the light source 28 and tube casing 30 slowly to traverse the sample 26 as the cylinder 20 rotates. The illustrated means comprises a motor 32 connected to drive a drum 34 over which is trained a pair of cables 36 and 38, the ends of which are connected to the light source 28 and tube casing 30, respectively. The cable 36 is trained over a pulley 40 positioned at the opposite end of the cylinder 20 from the drum 34, so that as the drum 34 revolves in the direction of the arrow, the light source will be slowly moved along the face of the drum. Similarly, the cable 38 is trained over a pair of pulleys 42 at the end of the cylinder 20 opposite the drum 34 and over a pulley 44 positioned above the drum so that the tube casing moves simultaneously with the light source 28. The motors 22 and 32 are geared motors and the speed of the rotation of the cylinder 20 and the traversing speed of the light source 28 and tube casing 30 is regulated so that a sample on the cylinder 20 is scanned in a series of helical paths or lines in close juxtaposition with one another. Any suitable manually operable switch (not shown) can be employed for the motors 22 and 32 and the light source 28, the latter being supplied from any suitable source of direct current of constant value.

Preferably, the tube casing 30 is provided with a hood means to restrict the sight of the tube 31 to a relatively small spot. Referring to FIG. 2, such means may comprise a tube 46 mounted on the tube casing and projecting towards the light 28. Secured within the tube are a pair of spaced plates 48 and 50 having aligned pinholes 52 so that light from the light source 28 to reach the tube 31 must pass through the two pinholes in succession. Preferably, movement of the tube casing and light is, for each revolution of the cylinder, equal to the diameter of the spot observed by the tube 31 whereby the entire surface of the sample will be scanned.

General Circuit Arrangement

FIG. 3 illustrates the general circuit arrangement of the major electronical components according to the present invention. The photoelectric tube 31, which is preferably of the photomultiplier type, is energized from a high voltage power source 52 and the signals generated in the tube are delivered to a clamping and preamplifying circuit 54 energized from a lower voltage power supply 56. The preferred photoelectric tube is sensitive primarily in the blue region of the spectrum, for example, such tube may be a 931A. The clamping circuit, as will be described in detail subsequently, causes the instrument of the invention to respond to changes in opacity in the sample, for example, the changes in opacity between printed and nonprinted areas, rather than to any actual value of opacity of the sample medium. Thus the actual opacity of the sample medium, for example, the paper in the case of printed material, does not affect the operation of the instrument as long as such opacity does not vary widely in a given sample. That is to say adjustment is not necessary between tests of samples with various opacities. The clamping and preamplifying circuit 54 responds to the signals of the photomultiplier tube 31 to produce signal voltages of two predetermined different values, the particular value of such voltage at any given time depending upon whether a printed or an unprinted area is being sensed.

The signal voltages from the clamping and preamplifying circuit 54 are supplied to an electronic switch unit outlined by the dotted line 58 and including a flip flop circuit 60 and an output stage 62 comprising a pair of amplifying sections 64, 66 having a high current output. The flip flop circuit 60 has a first steady state condition in which the circuit remains when one of the signal voltages from the clamping and preamplifying circuit is impressed upon the circuit, for example, the signal generated when unprinted portions of paper are being scanned. The flip flop circuit also has a second steady state to which it is driven when the other of the possible signal voltages is supplied from the clamping and preamplifying circuit 54, for example, when printed areas of the sample are being scanned.

The flip flop circuit 60 in its first steady state applies a control signal to the amplifier section 64 causing current to flow in its output circuit indicated at 68. At the same time the amplifying section 66 is driven to cut off by the flip flop circuit so that no current flows in the output circuit 70 thereof. In the second steady state of the flip flop circuit 60 the opposite condition occurs, that is to say the amplifying section 66 is controlled by the flip flop circuit to cause current in its output circuit 70 and the other amplifying section 64 is driven to cut off. The output stages are adjusted so that their output currents are of equal value. Connected in series in the output circuit 70 are a pair of current totalizing devices 72, 74, one of the devices, in this instance the device 74, being also connected in the output circuit 68. Thus the totalizing device 74 will be operated continuously so that the total quantity of electricity measured thereby will be proportional to the entire sample area. The other totalizing device 72 is controlled so as to be operated only when printed areas on the sample are being scanned so that the total quantity of electricity measured by it will be proportional to the printed area of the sample. The fraction of the sample area covered by printed matter may be easily computed from the two values of total current flow. The circuit components will now be described in greater detail.

Scanning Circuit

Referring now to FIG. 4 in the illustrated embodiment of the invention, the photomultiplier tube 31 of the scanning circuit has a cathode 82 onto which is directed the light from the light source 28 of FIG. 1. The cathode 82 is provided with a photoemissive surface and in the circuit illustrated is connected to one terminal 83 of the power source 52 so as to be maintained at a negative potential with respect to ground and light falling upon the same causes electrons to be emitted by the cathode. Such electrons are attracted to the first accelerator dynode 84 formed with a surface which is a good secondary electron emitter. The dynode 84 and successive dynodes indicated at 86 are maintained at progressively higher positive potentials with respect to the cathode by means of bleeder resistors 90 and 91 connected in series and to the other terminal 92 of the power supply 52. Such terminal 92 of the power supply 52 is maintained at a negative potential below ground by being connected to one terminal 93 of the power source 56. The collector 96 is maintained at an adjustable positive potential with respect to the last dynode 86 of the tube 31 through a load resistor 100 by means of a potentiometer 102 connected between the terminal 93 of the power source 56 and ground.

Changes in the output voltage of the photomultiplier tube 31 appearing across the load resistor 100 are applied through a capacitor 103 to the grid 104 of one section of a twin triode tube 105 forming part of the clamping and preamplifying circuit 54. The connection to the grid 104 is made through a scanning control circuit and will now be explained.

Scanning Control Circuit

A switching circuit is provided for connecting the photomultiplier tube 31 and its associated capacitor 103 to the grid 104 of the tube 105 when a sample which does not extend entirely around the cylinder 29 enters the scanning beam and for breaking the circuit to the grid 104 when the sample leaves the scanning beam. Such circuit includes a normally open switch 106 and a normally closed switch 108. These may be cam operated switches mounted on the scanning apparatus with suitable cams (not shown) so that the switch 106 is momentarily closed when rotation of the drum carries the sample into the scanning beam and the switch 108 is momentarily opened when the sample is carried out of the scanning beam. Since such cam arrangements are within the skill of the art, details thereof have not been shown. The switch 106 is connected in series between ground and one terminal of the actuating coil of a relay 112, which coil has its other terminal connected to the terminal 93 of the power supply 56. Upon closing the switch 106, the coil of the relay 112 is energized to close contacts 114 of the relay and complete a circuit from the collector 96 through the capacitor 103 to the grid 104 of the tube 105. Contacts 116 of the relay are also closed to complete a holding circuit through the switch 108 in parallel with the switch 106. The relay will thus remain closed until the holding circuit is broken by opening the switch 108. The sample will be mounted on the cylinder in a manner which enables the switch 108 to be opened when the scanning beam is at a marginal unprinted area and which also enables the switch 106 to be closed when the scanning beam is at another marginal unprinted area. As will appear below, under these conditions, the remaining circuits are in their normal condition when such switches are actuated. This means that the timing of the actuation of such switches is not critical but can be varied within relatively wide limits without affecting the accuracy of the results.

Clamping and Preamplifying Circuit

The grid 104 of the first triode section of the tube 105 is normally held at a negative potential with respect to ground. That is to say such grid is connected to the cathode 126 of the other triode section of the tube 105 and the cathode 126 is connected through the resistor 128 to the terminal 93 of the power supply 56 which as stated above is maintained at a negative potential with respect to ground. The cathode 129 of the first triode section of the tube 105 is at an adjustable positive potential with respect to the grid 104 by being connected to the variable tap of a potentiometer 130 which has its resistor connected between the terminal 93 of the power supply 56 and ground in series with a resistor 132 between the potentiometer 130 and ground. The potentiometer 130 thus applies an adjustable normal negative bias to the grid 104 with respect to the cathode 129. The plate 134 of the first triode section of the tube 105 is connected to the positive terminal 136 of the power source 56 through a load resistor 138 and an adjustable resistor 140 and the negative bias on the grid 104 of the tube is adjusted by the potentiometer 130 so that the first triode section is normally cut off. Such cut off drives the plate 134 of such triode section to a positive potential with respect to ground. Such positive potential is normally supplied to the flip flop circuit as one of the signal voltages mentioned above.

If a given amount of light is being received by the photomultiplier tube 31 and this amount of light is suddenly decreased, for example by the scanning beam encountering a printed area, the collector 96 of the tube 31 suddenly makes a positive excursion. A positive potential is thereby applied to the grid 104 of the tube 105 through the capacitor 103. This drives the plate 134 of such tube in a negative direction and the plate 134 assumes a negative potential with respect to ground. Because of the amplifying characteristics of the tube 31, this positive potential will in all operating ranges of the present apparatus be sufficient to drive the first triode section plate 134 of the tube 105 to a potential approximately that of its cathode 129. Electron flow to the grid 104 prevents such grid from going substantially positive with respect to its cathode 129, thus limiting or clamping the resulting change in potential of the plate 134 to a predetermined negative value. The positive potential thus applied to the grid 104 tends to return to the normal negative bias referred to above by discharge of the capacitor 103 through the resistor 128, but the time constant of the circuit including the capacitor 103 and resistor 128 is selected to be sufficiently high that the positive potential applied to the grid 104 does not materially decrease during any time interval encountered in the present apparatus. The negative potential thus produced on the plate 134 is supplied to the flip flop circuit as the other of the signal voltages mentioned above.

Upon the light reaching the photomultiplier tube 31 suddenly increasing, for example by the scanning beam reaching an unprinted area, the collector of the tube 31 makes a sudden negative excursion. This results in a negative potential being applied to the grid 104 of the tube 105. The value of this negative potential is limited or clamped by the other section of the tube 105 containing the cathode 126 so that the grid 104 cannot be driven more negative than its normal negative bias above described. The grid 142 and plate 144 of such other sections are connected together to provide a diode connection of such sections and such grid and plate are connected to the negative terminal 93 of the power source 56 to which the grid 104 of the tube 105 is also connected through the resistor 128. If such grid 104 and cathode 126 connected thereto tend to be driven negative with respect to the terminal 93, the diode connected section of the tube 105 conducts to maintain the cathode 126 and grid 104 at the potential of the terminal 93. The tube 105 is thus returned to its normal condition by any negative excursion of the collector 96 of the tube 31. Thus, the operation of the tube 105 is to supply two different predetermined values of signal voltage to the flip flop circuit in response to changes in the potential of the collector 96 of the tube 31 independently of the absolute value of the potential on such collector.

*Flip Flop Circuit of Switching Circuit*

The double triode tube 146 of the flip flop circuit is connected so that its second section is cut off when its first section is conducting and so that its second section is conducting when its first section is cut off. The cathodes 148 and 150 of both the first section and the second section, respectively, are connected together and to ground. Also, the plates 152 and 154 of such sections, respectively, are connected through load resistors 156 and 158, respectively, to the positive terminal 136 of the power source 56 through the adjustable resistor 140. The grid 160 of the first section is connected to the plate 134 of the tube 105 of the clamping and preamplifying circuit through the resistor 162. When the plate 134 has its first or normal positive potential, the first section of the tube 146 conducts. When the plate 134 has its second or negative potential, the first section of the tube is cut off so that it does not conduct. When such section does conduct, current flows through the resistor 156 so that the plate 152 is negative with respect to its potential when the first section of the tube is not conducting. The plate 152 is also connected to the negative terminal of the voltage source 93 by a voltage divider circuit including series resistors 164 and 166 so that the junction 168 between such resistors is held at a first negative potential with respect to ground when the first section of the tube is conducting and at a second positive potential with respect to ground when such first section is not conducting. Such junction 168 is connected through a resistor 170 to the grid 172 of the second section of the tube 146. When the first section of the tube 146 conducts, the negative potential applied to the grid 172 of the second section cuts off such second section and when the first section of the tube does not conduct, the positive potential applied to the grid 172 allows the second section to conduct. The tube 146 thus provides a flip flop action in which the two sections of the tube alternately conduct or do not conduct depending upon which one of the two predetermined signal voltages are supplied from the tube 105.

The plate 154 of the second section of the tube 146 is also connected to the negative terminal of the power source 56 through a voltage divider circuit containing the series resistors 173 and 174 so that the junction 176 between such resistors varies between a first positive potential with respect to ground when the second section of the tube 176 does not conduct and a second negative potential with respect to ground when the such second section conducts. This portion of the plate circuit of the second section of the tube 146 is entirely similar to the portion of the plate circuit of the first section of the tube which contains the resistors 164 and 166. In such circuits, a capacitor 178 by-passes the resistors 164 and 173 to improve the pulse rise time of the circuits.

*Output Stages of Switching Circuit*

The output stages of the switching circuit contain two similarly connected tubes 180 and 182 having their cathodes connected to ground through a common resistor 184. The control grid 186 of the tube 180 is connected through the resistor 187 to the junction 168 between the resistors 164 and 166 in the plate circuit of the first section of the flip flop tube 146 and similarly the control grid 188 of the tube 182 is connected through a resistor 189 to the junction 176 between the resistors 172 and 174 in the plate circuit of the second section of the flip flop tube 146. Thus, when the first section of the tube 146 is conducting, the tube 180 is cut off in the same manner as the second section of the tube 146 is cut off, and when the first section of the tube 146 is cut off so that the second section of the tube 146 is conducting, the tube 182 is cut off. Conversely, when the first section of the tube 146 is cut off, the tube 180 conducts and when the second section of the tube 146 is cut off, the tube 182 conducts. Thus, the tube 180 conducts when a decrease of light to the photomultiplier tube 31 drives the grid 104 of the first section of the tube 105 in a positive direction to drive the grid 160 of the first section of the tube 146 in a negative direction. Conversely, the tube 182 conducts when an increase of light to the tube 31 drives the grid 104 of the first section of the tube 105 in a negative direction to drive the grid 160 of the first section of the tube 146 in a positive direction.

The plates 190 and 192 of the tubes 180 and 182, respectively, are connected to the positive terminal 136 of the power source 56 through current totalizing devices as described below and for proper operation of such totalizing devices, the output currents of the two tubes 180 and 182 should be of equal value. Since one only of these tubes is conducting at all times, the current through the common cathode resistor 184 should remain constant if the system is working properly. This means that the voltage across such resistor should remain constant during switching operations of the tubes 180 and 182. An electron ray indicator tube 194 of the "tuning eye" type may be employed by indicate variations in such voltage. Such tube may have its cathode connected to ground through a variable resistor 196 and its anode target connected to the positive terminal of the power source 56 through the resistor 140. The control grid 198 may be selectively connected through the switch 200 to the cathodes of the tubes 180 and 182. When so connected, the angle between shadows on the target of the tube 194 should remain constant during operation of apparatus in which case, the respective values of currents in the plate circuits of the tubes 180 and 182 as these tubes alternately conduct must be equal. If there is a variation of such angle or blinking of the shadows on the target of the tube 194, a variable resistor 202 in the plate circuit of the tube 182 may be adjusted until such blinking ceases. The tube 194 may also be employed to indicate that the flip flop circuit is operating. That is to say the switch 200 may also be employed to connect the control grid 190 of the indicator tube 194 to the junction 176 in the plate circuit of the second section of the flip flop tube 146 through the resistor 204. Changes in the potential of such junction will cause blinking of the pattern of the tube 194 if the circuit is functioning properly.

Current Totalizing Devices

The current totalizing devices shown for integrating the amount of electricity flowing through the plate circuits of the tubes 180 and 182 during a test operation are of the gas coulometer type. One such coulometer 206 has its electrodes connected in series in the plate circuit of the tube 182 only. The first coulometer 206 and the second coulometer 208 have their electrodes connected in series and both are connected in series in the plate circuit of the tube 180. Thus current flows through coulometer 206 irrespective of which tubes 180 and 182 conduct so that current flows through the coulometer 206 during an entire test. Current flows through the coulometer 208 only when the tube 180 conducts as a result of a decrease in light reaching the photomultiplier tube 31 resulting in increase current flow in the first section of tube 105 with resulting cutting off of the first section of tube 146 and driving of the control grid 186 of the tube 180 in a positive direction. The gas collecting in coulometer 208 is thus proportional to the printed area of the test specimen scanned and the gas collecting in coulometer 206 is proportional to the total area of the test specimen scanned. The quotient of the two values gives the ratio of the printed area to the total area.

The operation of the coulometers 206 and 208 is controlled by a manually operable switch 210 and a cam operated switch 212 connected in series with each other and between the coulometers and the positive terminal 136 of the power source 56, a variable resistor 214 also being connected in series in such circuit. The switches 210 and 212 are both of the single pole, double throw type and upon activation of either switch to its alternate position from that shown, the circuit through the coulometers 206 and 208 is broken and the positive terminal 136 of the power source 56 connected to ground through a variable resistor 216 providing approximately the same load as the coulometers 206 and 208 and the tubes 180 and 182. The switch 212 is cam operated so as to be in the position shown at the start of a scanning operation and be moved to its alternate position at the end of such scanning operation. In order to hold the voltages supplied by the power source 56 constant, the negative terminal 93 of such source is connected to ground through a voltage regulator tube 218 and the positive terminal 136 of such source is connected to ground through the resistor 140 and a voltage regulator tube 220. By way of example, the voltage at the negative terminal of the tube 218 with respect to ground may be −105 volts and the voltage at the positive terminal of the tube 220 may be +150 volts with respect to ground. Also by way of example, the voltage between the terminals of the power supply 52 may be approximately 900 volts so that the negative terminal 83 of such source may be approximately −1000 volts with respect to ground.

Coulometers

While the coulometers 206 and 208 may be of any suitable construction, they may be constructed as shown diagrammatically in FIG. 5. Referring to FIG. 5, the coulometers each comprise a vertical, graduated collector column 230 formed of glass and in the bottom of which are mounted the electrodes 232, 234 having leads extending through the walls of the column and connected in series in the corresponding output circuit as previously described. The column 230 is provided with a stop cock 236 at its upper end which is kept closed while gas is collecting in the column 230 during a measurement, but which may be opened to bleed off such gases and reset the instrument upon start of a new measurement. To aid in leveling the electrolyte at the start of a measurement, the column is preferably provided with a bleeder tube 238 leading to the stop cock and formed with its lower end even with the top graduation on the column 230. Communicating with the collector column 230 above the electrodes 232, 234 but below the lowest graduation on the column is a vertical by-pass tube 240 which extends above the collector column 230, the upper end of the tube 240 being open and turned downwardly. The outlet of the stop cock 236 may be connected to the upper end of the tube 240 by a connecting tube 243 which serves rigidly to connect the column and tube 240 for mechanical strength. Connected to the bottom of the collector column 230 is a flexible tube 242 leading from a reservoir vessel 244. The coulometer is, of course, supplied with a suitable electrolyte such as, for example, a dilute aqueous solution of sulfuric acid. Current passing between the electrodes 232, 234 causes disassociation of the water into hydrogen and oxygen gases which will pass upwardly and collect at the top of the column 230. At the end of a measuring cycle the reservoir 244 is adjusted so as to bring the level of the liquid therein even with the liquid level in the column 230. The volume of gas collected is then read.

The by-pass tube 240 is provided as a safety measure. It will be observed that if a coulometer were a single closed vertical column, pressure of the collected hydrogen and oxygen gases could force the liquid level to the electrodes 232, 234 exposing them to the gases. Arcing might possibly occur when they are exposed and which would cause the hydrogen and oxygen to ignite in an explosive reaction. In the illustrated coulometer, this cannot occur since the generated gases will bleed off through the by-pass tube 240 if the liquid level is forced below the point of connection of the tube 240 to the collector column so that the liquid level will not go below this point.

Operation

The operation of the apparatus is as follows. A sample to be scanned is positioned on the drum 20 so as to extend either partially or completely around the drum. When the sample does not cover completely the drum circumference, the cam operated switches 106 and 108 are then adjusted so as to measure only the portions of the drum circumference covered by the sample. The motor 32 is employed to position the phototube casing 30 adjacent an edge of the sample. Both motors 22 and 32 are then started and the switch 210 is closed manually to start the measurement. The light source 28 and photomultiplier tube case 30 travel longitudinally of the cylinder at the same rate while the cylinder revolves.

A positive excursion of the potential on the collector 96 due to a printed portion of the sample blocking the scanning beam to decrease the light reaching the tube 31 causes positive potential to be applied through the capacitor 103 to the normally negatively biased control grid 104 of the clamping and amplifying tube 105. This positive potential is limited to driving such grid to substantially zero potential relative to its cathode 129 because of electron flow to the grid 104. The time constant of the circuit of the grid 104 is such that the grid remains at approximately such potential for an extended period of time. The positive potential thus applied to the grid causes increased current flow in the circuit of the plate 134 of the tube 105 to drive such plate from a first predetermined positive potential with respect to ground to a predetermined negative potential. The first predetermined positive potential of such plate holds the grid 160 of the flip flop tube 146 at a neutral or slightly positive potential with respect to the cathode 148 which permits flow of current in the circuit of the plate 152. The second predetermined negative potential of the plate 134 caused by the positive excursion of the collector 96 of the tube 31 causes the grid 160 of the tube 146 to be biased past cut off to cause current flow to cease in the circuit of the plate 152. This causes a positive excursion of the plate 152 and a part of the resulting more positive potential is applied to the grid 172 of the tube 146 to cause current flow in the circuit of the plate 154 causing a negative excursion of such plate. A part of the positive excursion of the plate 152 is also applied to the grid 186 of the switching tube 180 to cause conduction of such tube and a part of the negative excursion of the plate 154 of the tube 146 is applied to the grid 188 of the switching tube 182 to cut off such tube. Current flow through the tube 180 flows through the coulometers 206 and 208.

When the printed area passes from beneath the scanning beam, the collector 96 of the tube 31 makes a negative excursion because of increased light reaching the tube 31. Such negative excursion causes a negative potential to be applied to the grid 104 of the tube 105 to drive such grid in a negative direction. Such negative potential is limited to the first predetermined negative potential mentioned above since the grid 104 is connected directly to the cathode 126 of the other section of the tube 126 and electron flow to the plate 144 and grid 142 of such tube will occur if the negative potential applied to the cathode 126 tends to be more negative than the potential of the grid 142 and plate 144. Thus the negative potential applied to the grid 104 from the collector 96 cannot carry the bias of the grid 104 more negative than its normal negative bias. The grid 142 is thus returned to its normal first predetermined negative potential such that the plate 134 makes a positive excursion back to its first predetermined positive potential with respect to ground so that the first section of the tube again conducts. This causes a negative excursion of the plate 152, a part of which is applied to the grid 172 of the tube 146 to cut off the second section thereof and also is applied to the grid 186 of the tube 180 to cut off this tube. Cutting off of the second section of the tube 146 causes the plate 154 thereof to make a positive excursion, a part of which is applied to the grid 188 of the tube 182 to cause such tube to conduct. Current flows in the plate circuit of such tube and only through coulometer 206. When another printed portion on the sample blocks the scanning beam, the two tubes 180 and 182 again reverse their conductive conditions, etc. Current thus flows alternately through the two tubes 180 and 182 and the value of the current through one tube is made equal to the subsequent value of current through the other tube by adjusting the resistor 202 until the voltage across the common cathode resistor 184 remains constant as indicated by the electron ray indicator tube 194.

The stop switch 212 can be set to be opened when the second edge of the sample is reached. The volumes of gas produced and collected in the coulometers 206 and 208 are proportional to the total areas scanned and the printed area thereof, respectively.

If the sample of printed matter to be measured is of heavy kraft paper or other relatively opaque material, we have found that the light transmissibility of the unprinted areas can be improved to secure greater contrast between such unprinted areas and the printed areas by treating the sample with a suitable saturating agent. This may be colorless oil but preferably is a more volatile liquid, such as cleaning solvent, so that the sample will dry more quickly after measurement has been made. In the latter case, a sheet of light transmitting material is wrapped about the drum so as to cover the sample and prevent evaporation of the volatile liquid during the measurement.

Obviously, the invention is readily adapted to measurements by reflected rather than by transmitted light, and it will also be obvious that the apparatus of the invention is readily adapted to measurement of areas of color contrast by selection of a suitable light source and suitable color sensitive photoelectric cell.

Having illustrated and described the preferred embodiment of the invention, it should be apparent to those skilled in the art that the invention permits of modification in arrangement and detail. We claim as our invention all such modifications that come within the true spirit and scope of the appended claims.

We claim:

1. Apparatus for measuring the ratio of a first area to the total area of an object providing two areas having photo contrast with respect to each other comprising photoelectric scanning means for progressively scanning an object and for sensing the presence of said areas, a control circuit connected to said scanning means including an electronic switch circuit having first and second output circuits, said switch circuit having a first state providing an output current in said first output circuit when said scanning means senses one of said areas and a second state providing an output current in said second output circuit when said scanning means senses the other of said areas, a pair of current totalizing devices, circuit means connecting both of said current totalizing devices in series in said first output circuit and circuit means connecting only one of said current totalizing devices in said second output circuit.

2. Apparatus for measuring areas of printed material upon a sheet of paper comprising photoelectric scanning means for scanning progressively a printed paper and for sensing changes in the opacity of the sheet as scanning progresses across printed areas and unprinted areas, a control circuit connected to said scanning means including an electronic switch circuit having first and second output circuits, said switch circuit having a first state providing an output current in said first output circuit when said scanning means senses one of said areas and a second state providing an output current in said second output circuit when said scanning means senses the other of said areas, a pair of current totalizing devices, circuit means connecting said current totalizing devices in series in said first output circuit and circuit means connecting only one of said current totalizing devices in said second output circuit.

3. Apparatus for measuring areas of printed material upon a sheet of paper comprising photoelectric scanning means for scanning progressively a predetermined area of a printed paper and for sensing and signaling changes in the opacity of the sheet as scanning progresses across printed and unprinted areas, a signal circuit connected to said scanning means for supplying a first voltage of predetermined amplitude upon progression of said scanning means from an unprinted to a printed portion of said sheet and a second voltage of different amplitude upon progression of said scanning means from a printed portion to an unprinted portion of said sheet, an electronic switch circuit connected to said signal circuit having first and second output circuits, said switch circuit having a first state responsive to a said first voltage for generating an output current in said first output circuit and a second state responsive to a said second voltage for generating an output current in said second output circuit, a first and a second current totalizing device, circuit means connecting both of said current totalizing devices in series in one of said output circuits and circuit means connecting only one of said current totalizing devices in the other of said output circuits.

4. Apparatus for measuring areas of printed material upon a sheet of paper comprising photoelectric scanning means for scanning progressively a predetermined area of a printed paper sheet and for sensing and signaling changes in the opacity of said sheet as scanning progresses across printed and unprinted areas, a clamping circuit connected to said scanning means for generating a first signal of predetermined amplitude upon progression of said scanning means from an unprinted to a printed portion of said sheet and a second signal of different amplitude upon progression of said scanning means from a printed portion to an unprinted portion of said sheet, a unistable electronic switch circuit connected to said clamping circuit having first and second output circuits, said switch circuit having a first steady state responsive to a said first signal for generating an output current in said first output circuit and a second steady state responsive to a said second signal for generating an output current in said second output circuit, a first and a second current totalizing device, circuit means connecting both said current totalizing devices in series in said first output circuit and circuit means connecting only said second current totalizing device in said second output circuit.

5. Apparatus for measuring areas of printed material upon a sheet of paper comprising photoelectric scanning means for scanning progressively a predetermined area of a printed paper sheet and for sensing and signaling changes in the opacity of said sheet as scanning progresses across printed and unprinted areas, a clamping circuit connected to said scanning means for generating a first signal of predetermined amplitude upon progression of said scanning means across a printed portion of said sheet and a second signal of different amplitude upon progression of said scanning means across an unprinted portion of said sheet, a unistable flip flop circuit connected to the output of said clamping circuit, said flip flop circuit having a first and second output circuit, and having a first state responsive to a said first signal for supplying a signal voltage in said first output circuit and a second state responsive to a said second signal for supplying a second voltage of different amplitude in said second output circuit, and an amplifying and output stage connected to said flip flop circuit having first and second output circuits, said output stage having a first condition responsive to said first signal voltage for generating an output current in said output stage first output circuit and a second condition responsive to said second signal voltage for generating an output current in said output stage second output circuit, a first and a second current totalizing device, circuit means connecting both said current totalizing devices in series in the said output stage first output circuit and circuit means connecting only said second current totalizing device in said output stage second output circuit.

6. Apparatus as set forth in claim 1 wherein said current totalizing devices comprise gas coulometers.

7. Apparatus as set forth in claim 1 wherein said current totalizing devices comprise gas coulometers, said coulometers each comprising a vertical hollow column, valve means at the top of said column for opening and closing the same, a pair of electrodes mounted in spaced relation within said column and adjacent the lower end thereof, a vertical by-pass tube mounted adjacent said column and extending thereabove, the bottom of said by-pass tube being connected to said column near the bottom of said column but at a point spaced above said electrodes.

References Cited in the file of this patent
UNITED STATES PATENTS

| | | |
|---|---|---|
| 658,022 | Rimington | Sept. 18, 1900 |
| 1,006,612 | Weintraub | Oct. 24, 1911 |
| 1,889,758 | Nakken | Dec. 6, 1932 |
| 2,360,883 | Metcalf | Oct. 24, 1944 |
| 2,798,965 | Goldfisher | July 9, 1957 |